S. GROSSMAN.
RESILIENT WHEEL.
APPLICATION FILED JAN. 30, 1918. RENEWED NOV. 27, 1918.
1,314,643.
Patented Sept. 2, 1919.
3 SHEETS—SHEET 3.
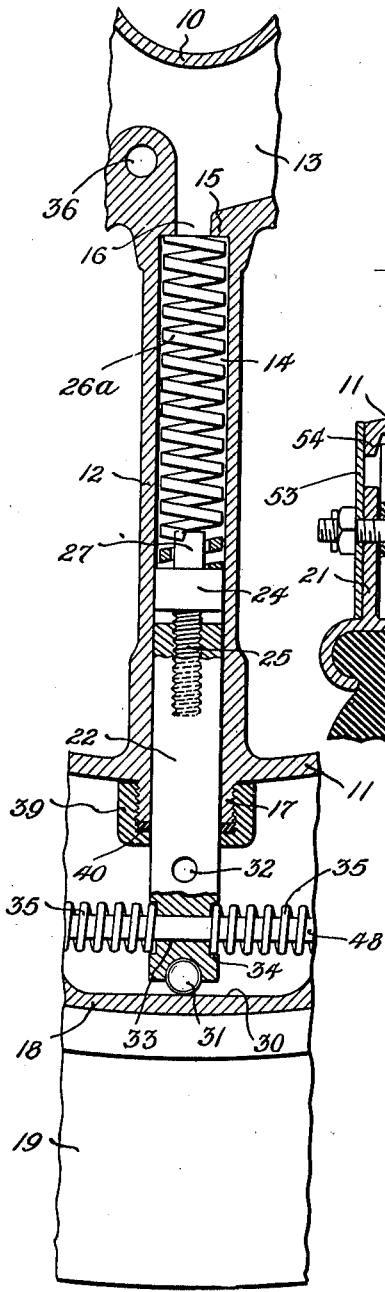
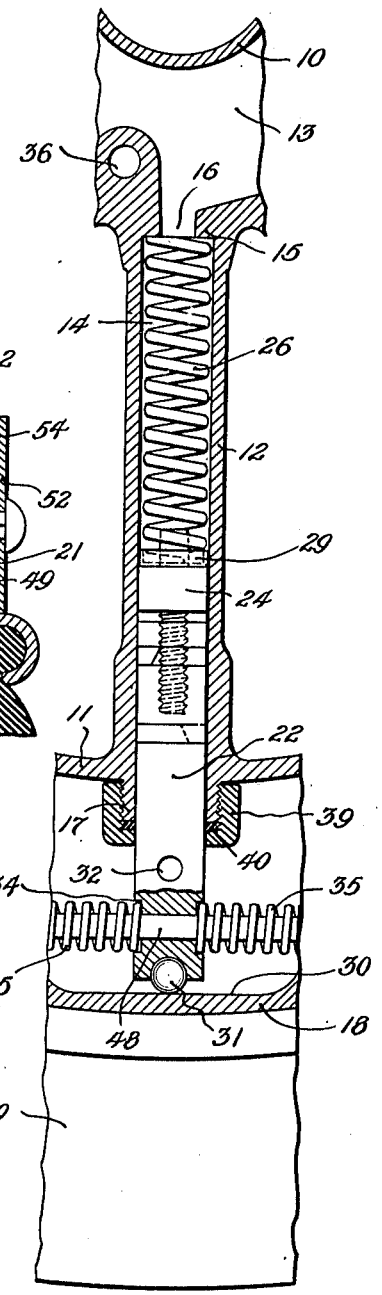
WITNESSES
INVENTOR
S. Grossman
BY
ATTORNEYS

UNITED STATES PATENT OFFICE.

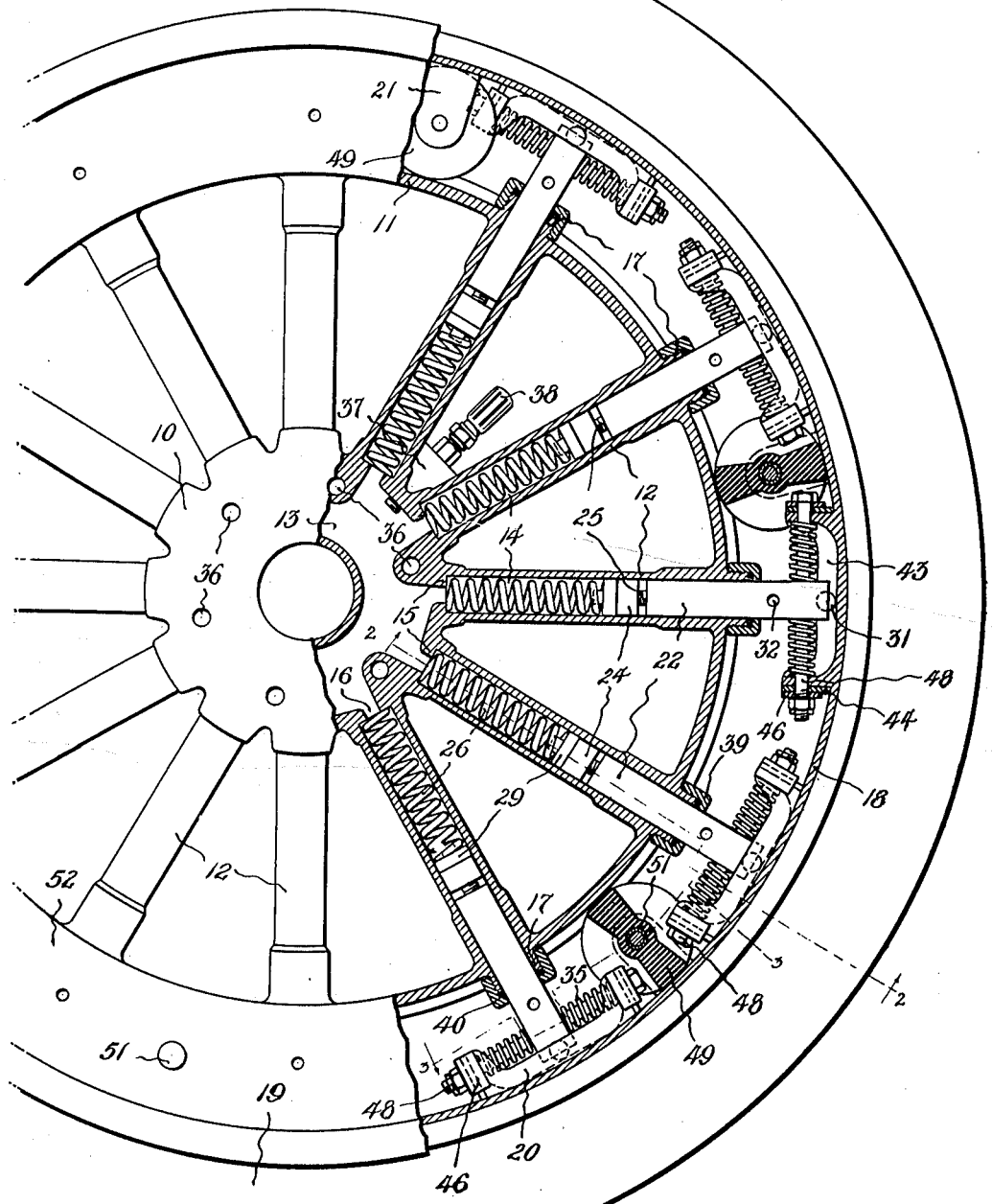

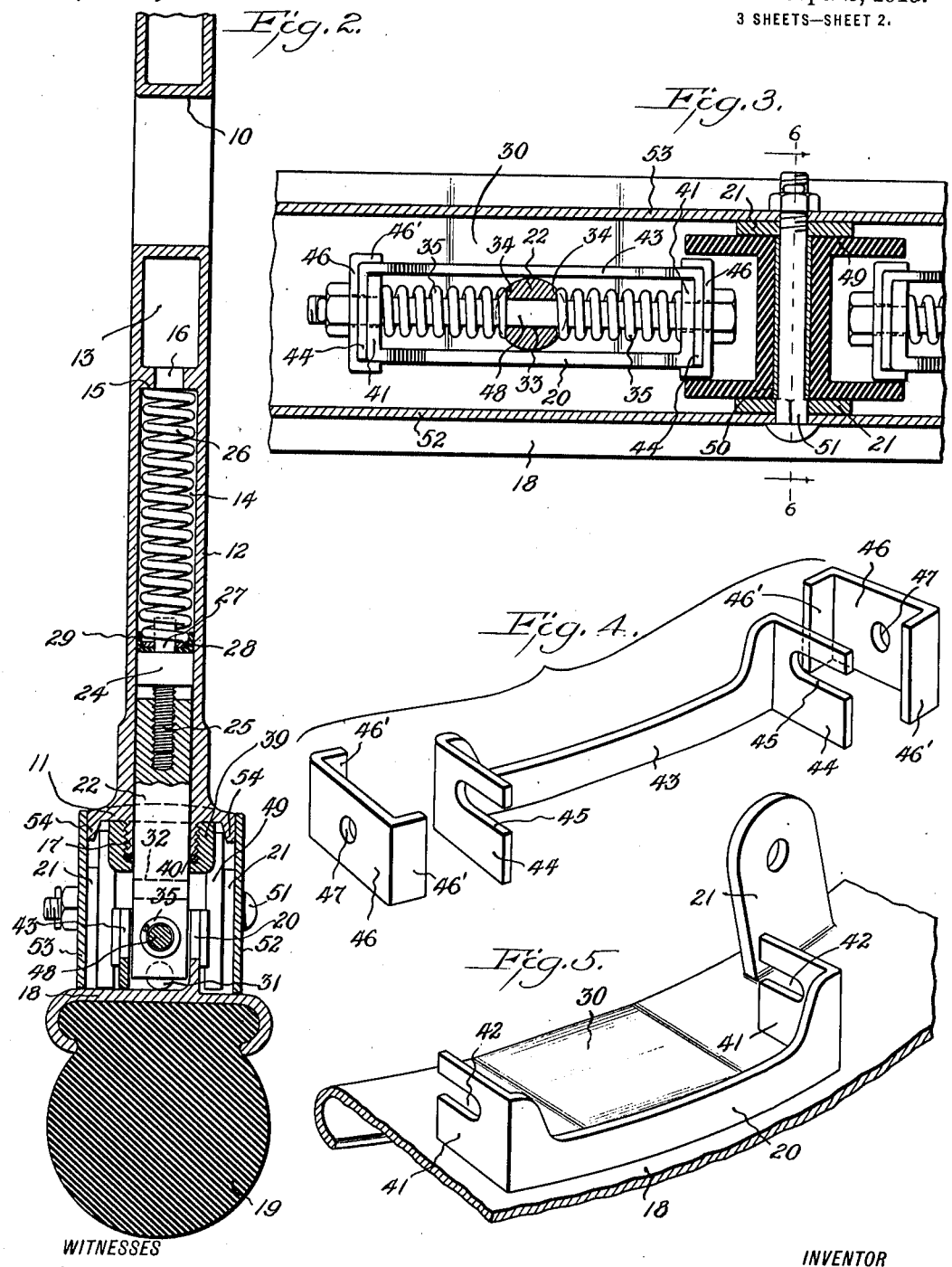

SAMUEL GROSSMAN, OF NEW YORK, N. Y.

RESILIENT WHEEL.

1,314,643.

Specification of Letters Patent.  Patented Sept. 2, 1919.

Application filed January 30, 1918, Serial No. 214,481. Renewed November 27, 1918. Serial No. 264,467.

*To all whom it may concern:*

Be it known that I, SAMUEL GROSSMAN, a citizen of the United States, and a resident of the city of New York, borough of the Bronx, in the county of Bronx and State of New York, have invented a new and Improved Resilient Wheel, of which the following is a full, clear, and exact description.

This invention relates to resilient wheels and has particular reference to wheels intended for automobiles or similar vehicles.

Among the objects of the invention is to provide a wheel having the general appearance of the popular type of automobile wheels having pneumatic tires, but one which is not subject to the dangers and disadvantages inherent in wheels with inflatable tires.

More definitely stated my improvement comprises a wheel of the type in which there are provided inner and outer rim members which are normally concentric with the axis of the wheel but between which there is adaptability for relative radial movement, resilient means being provided within the spokes or hub to resist such radial movement.

A still further object is to provide an improved type of cushion or bumper serving to resist or help to limit the extent of aforesaid radial movement relatively between the two rims, or in other words the possible eccentricity of the outer rim and tire carried thereby with respect to the axis of the wheel.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a side elevation of a wheel embodying my improvements, a portion of the wheel being broken off and another portion being in central section along a plane perpendicular to the axis.

Fig. 2 is a transverse sectional detail on the line 2—2 of Fig. 1.

Fig. 3 is a detail view substantially on the broken line 3—3 of Fig. 1 looking outward toward the outer rim.

Fig. 4 is a perspective view of certain parts of the spoke anchor separated from one another.

Fig. 5 is a similar view of the portion of the outer rim to which the fixed portion of the anchor means is secured.

Fig. 6 is a transverse sectional detail approximately on the line 6—6 of Fig. 3; and Figs. 7 and 8 are detail views of slightly modified forms of the invention, the views corresponding in nature to the view in Fig. 1.

Referring now to Fig. 1 it will be noted that one important feature of my construction comprises a hub 10, a rigid inner rim 11 and a series of radial tubular spokes 12 preferably formed integral with the hub and inner rim. This hub structure including the spokes and inner rim is made preferably as a unitary casting and suitably cored to provide a hub cavity 13, while each of the spokes is bored at 14 from its outer end inward to a shoulder 15, a port 16, however, being provided between each of the bores 14 and the hub cavity whereby all of the spoke bores communicate with one another through the hub cavity but otherwise the casting is imperforate with respect to said cavity and passageways. The extreme outer end of each tubular spoke comprises an externally threaded boss 17 projecting beyond the outer face of the inner rim.

The outer rim 18 constituting or representing the tread member is outwardly spaced from the inner rim, but normally concentric therewith. This outer rim 18 is of a rigid nature and may, like the inner structure, be made as an integral casting including a series of fixed anchor members 20, one for each spoke, and a pair of inwardly projecting lugs 21.

In the bore 14 of each tubular spoke 12 is fitted a plunger 22 which may be termed a spoke extension. The plunger comprises a plurality of relatively endwise movable parts, one of which is a head or piston 24 between which and the main portion of the plunger is a threaded connection 25 which acts when the two parts of the plunger are given a relative rotation to elongate the plunger. Between the head 24 and the shoulder 15 of the hub is located a cushion member preferably in the nature of a strong coil spring 26 into the outer end of which a stud 27 projects from the piston as a centering device. This outer end of the spring may be supported upon any suitable wear member such as a metal washer 28 around which is fitted a flexible packing member 29 subject to the compressibility of the spring or other cushioning means that may be employed in connection therewith. The plunger is free to reciprocate in the outer end of the bore 14 and through the boss 17, the outer end of the plunger projecting into proximity to a bearing surface 30 on the inner face of the outer rim 18, but spaced therefrom in practice by virtue of an antifriction member 31 carried in the end of the plunger.

The part of the plunger that projects beyond the boss 17 is provided with two transverse holes 32 and 33 arranged at right angles to each other, the latter being nearer the outer end of the plunger than the former. The body of the plunger at the ends of the hole 33 may be counterbored or flattened as indicated at 34 forming seats for a pair of springs 35 to be referred to more specifically later.

This type of wheel is adapted particularly for manufacture independently of the vehicle and is designed to be connected to a standard vehicle hub as by means of bolts or rivets to be passed through transverse holes 36 formed through the hub parallel to its axis.

At any convenient place, as for instance at 37 a valve 38 is fitted to the hub structure for the admission of oil or any other desired fluids such for instance as a liquid to fill the hub cavity which serves in connection with the springs 26 as a cushioning device, or for the admission of air, or for the admission of a lubricant. I may state in this connection that the form of the piston or packing means illustrated in Figs. 1 and 2 is designed especially for employment of a liquid in the hub cavity. The form in Fig. 7 is designed especially for the springs 26ª to constitute the spoke cushioning means, while in Fig. 8 the form is designed especially for the filling of the hub cavity with compressed air. By making the ports 16 relatively small the flow of liquid therethrough may be relatively slow for the purpose of the cushioning action.

In the assemblage of the wheel the plungers or spoke extensions are projected into the bores 14 against the springs 26 and the caps 39 are passed over the outer ends of the plungers and screwed upon the bosses 17 forming in connection with gaskets 40 stuffing boxes, making practically fluid tight connections between the plungers and the bosses. These caps 39 furthermore constitute guide means for the plungers 22 that reciprocate therein. With respect especially to the rear or traction wheels that are subjected to tangential strains there is in practice considerable tendency for the plungers to bear abnormally against one side wall of the hollow spokes rather than the other. These caps 39, therefore, with the gaskets embraced thereby having more or less intimate contact with the plungers serve as considerably more than nuts. In fact inasmuch as the bosses 17 are integral parts of the hub and spoke structure the caps 39 and gaskets 40 are primarily packing and guiding means making relatively fluid tight closures for the spoke cavities and direct guiding means for the spoke plungers. The inner rim and hub structure with the spoke extensions fitted therein as just described is then brought into position with the outer ends of the plungers adjacent to one edge of the outer rim 18 or with the antifriction rollers 31 in contact with the inner face of the rim 18. A tool is then applied in the hole 32 of the several spokes in succession for the purpose of extending or separating the two parts of each plunger placing the springs under the desired amount of compression. Any suitable means well understood in shop practice and for this reason not illustrated may be employed to prevent the rotation of the parts 24 of the plungers while the parts 22 are rotated for adjustment.

The reader's attention is now called especially to the anchor means for connecting the outer ends of the plungers to the outer rim. One portion of this means already referred to at 20 is made integral or fixed rigidly to the inner face of the outer rim. This member comprises an inwardly projecting web parallel to but at one side of the central plane of the rim and having at its ends a pair of inwardly projecting wings 41 parallel to the axis of the plunger that operates between them and having open ended slots or notches 42, the rounded inner ends of which slots are coaxial with each other and the open ends of the slots being directed away from the web or toward that side of the rim from which the hub structure is presumed to be moved into final position with the end of the spoke extension close to or against the inner face of said web. 43 indicates a detachable web member having end wings 44 corresponding in form to the wings 41 and having open ended slots 45, the open ends of the slots, however, being directed in the opposite direction from the slots 42 but so arranged that the inner ends of the slots 45 are adapted to be positioned co-axially with the other slots 42 when in assembled position. The wings 44 as shown in Fig. 3 are adapted to lie directly against the outer faces of the wings 41. A pair of clips 46 having central holes 47 coöperate with the wings 41 and 44 to prevent lateral separation of the web members of the anchor device in the assembled position. 48 indicates a bolt having a head at one end and a nut at the other adapted to pass through the co-axial slots and holes as well as through the hole 33 in the plunger. The assemblage is effected as follows: After the plunger is extended as already described to tighten the spring 26 one clip 46 is slipped upon the bolt up against or substantially against its head and one of the springs 35 is slipped on toward or against the clip, the bolt then is passed through the hole 33 and the other spring 35 is slipped upon it. The loose web member 43 is then slipped into place, the open ended slots 45 straddling the ends of the bolt and the inner portion of the wheel as a whole is then shoved into its final position, the outer ends of the plungers coming against the fixed web members 20 and the wings 44 overlapping the wings 41. The bolt head during this action will be sufficiently far remote from the plunger to allow the clip adjacent thereto to pass the fixed wing 41. The bolt is then shoved home, the other clip 46 is put in place thereon and the nut tightened and locked by any suitable means. The flanges 46' at the ends of the clips overlapping the end portions of the wings prevent any possible separation of the web members so long as the clips are held by the bolt from endwise movement. It will thus be seen that the end of the spoke as shown in Fig. 3 is limited from lateral movement toward or from the edges of the outer rim by reason of the webs 20 and 43. The end of the plunger, however, is free within certain limits to move circumferentially of the wheel against the resistance set up by the springs 35. I provide, therefore, that while the effective length of any spoke or series of spokes that are called upon to resist a force tending to collapse the wheel may respond to such force against the cushioning means 26 or the fluid means within the hub cavity, this movement to be accompanied with a corresponding elongation of the spoke or spokes directly opposite thereto, it is still expedient for intermediate spokes to partake of a slight tangential or circumferential movement accordingly, such movement being practically frictionless because of the antifriction rollers 31.

Among the purposes of each pair of lugs 21 is to support a bumper 49 made preferably substantially spool shaped and of solid rubber, or its equivalent, or it may be described as of cylindrical form with the two faces thereof cut off adjacent to the heads of the adjacent bolts 48. I preferably provide one bumper for each two spokes between the centers of which the lugs are arranged circumferentially. Each bumper is provided with a central metallic bushing 50 through which is projected a supporting bolt 51 hung upon or between the two face plates 52 and 53 which constitute closures for the space between the inner and outer rims. Another purpose, therefore, of the lugs 21 is to serve, in connection with the bolts 51, as supporting or anchorage means for the face plates. The diameter of the bumper is preferably slightly greater than the normal space between the inner and outer rims so that when the bumper is inserted it will be subjected to a slight degree of compression. The bumper is adapted to roll slightly around the axis of the bolt 51 while the adjacent spokes are moving circumferentially with respect to the outer rim, but much rotation of the bumper is prevented by contact thereof with the heads of the bolts 48. In practice the outer portion of the bumper may bear less forcibly upon the rim 18 than the inner portion does upon the rim 11, the rotation being mainly around the bolt 51. This bumper serves mainly as a cushioning means to limit the eccentric movement of the outer rim, such movement however being positively limited by contact of the flanges 54 against the outer ends of the lugs 21, in the case of emergency. The radial width of the face plates is such, however, that there shall never be any material space or gap through which dust, mud, or the like, might enter the space between the rims.

I claim:

1. The combination with the herein described hub and spoke construction for wheels consisting of an integral casting providing a hub, a rim concentric with the hub and a series of tubular spokes extending between the hub and the rim, the outer end of each spoke constituting an externally screw threaded boss on the outside of the rim, of a series of spoke elements mounted in the several tubular spokes, and a packing cap surrounding each spoke element and connected to a boss and serving thereby to make a fluid tight seal for the outer end of the adjacent tubular spoke and constituting a guiding means for the spoke element reciprocating therein.

2. In a resilient wheel, the combination with a hub construction comprising an annular central portion, a rim and a series of hollow spokes connecting the central hub portion to the rim, the hub having an annular cavity communicating with each of the several spokes, the inner end of each spoke being provided with an integral shoulder while the spoke otherwise is provided with a smooth bore, of an outer rim spaced from the inner rim aforesaid, a series of radially extensible spoke extensions adapted to reciprocate in the smooth bores thereof, resilient means within the hollow portions of the hub structure tending to force the extensions outward radially and bearing against said shoulders, and means within the space between the rims serving to secure the outer ends of the extensions to the outer rim.

3. In a resilient wheel, the combination with inner and outer rims spaced from each other and a series of radially extensible spoke members extending from the inner rim into proximity to the outer rim, resilient means interposed between said spoke members and the center of the wheel providing for radial compression and an anchoring device for each spoke member securing the outer end thereof to the inner surface of the outer rim, said anchor device serving to hold the outer end of the spoke member from movement with respect to the outer rim either radially or laterally but permitting tangential movement, and resilient means to limit said tangential movement.

4. In a resilient wheel, the combination with inner and outer rims spaced from each other, a series of spoke members projecting from the inner rim into proximity to the outer rim, means acting upon the spoke members tending to hold the two rims concentric but permitting eccentric movement thereof with relation to each other under load, an anchor device for the outer end of each spoke member located in the space between the rims, said anchor device comprising a pair of laterally spaced circumferentially arranged web members between which the end of the spoke member is fitted and snugly held from lateral movement, means to connect and hold the ends of the web members in positive fixed spaced relation, a rigid member extending through the end connections and the end of the spoke member serving to prevent radial movement of the spoke member, and cushioning devices between the end of the spoke member and said end connections permitting a limited amount of tangential movement of the spoke member with respect to the outer rim and anchor means.

5. In a resilient wheel, the combination with inner and outer spaced rims, a series of spoke extensions leading from the inner rim to the outer rim, means acting upon the spoke extensions tending to keep them extended radially and so hold the two rims concentric, anchor means within the space between the two rims serving to hold the outer ends of the spoke extensions to the outer rim but permitting tangential movement of the outer ends thereof with respect to the outer rim, a pair of annular face plates serving to keep the space between the two rims closed irrespective of the possible relative eccentric movement of the rims, and means locking said face plates rigidly to one of the rims; said locking means including a plurality of transverse pivots and resilient bumper means mounted upon said pivots, each bumper being located between a pair of adjacent anchor means whereby the extent of rotation of the bumper around its pivot is limited.

SAMUEL GROSSMAN.